United States Patent [19]
Blessing

[11] 3,753,334
[45] Aug. 21, 1973

[54] PROTECTIVE BONNET FOR ANIMALS
[76] Inventor: Jacqueline M. Blessing, 5074 Cohoctah Rd., Linden, Mich. 48451
[22] Filed: Nov. 3, 1971
[21] Appl. No.: 195,110

[52] U.S. Cl. .................................. 54/80, 119/142
[51] Int. Cl. ........................................... B68c 05/00
[58] Field of Search .................. 54/80, 81; 119/142, 119/143

[56] References Cited
UNITED STATES PATENTS

| | | |
|---|---|---|
| 2,871,642 | 2/1959 | Damone .............................. 54/80 |
| 984,017 | 2/1911 | Moritz ................................ 54/80 |
| 3,609,941 | 10/1971 | Eldredge ............................ 54/80 |
| 584,947 | 6/1897 | Lundburg ........................ 54/80 X |
| 1,102,570 | 7/1914 | Callahan .......................... 119/143 |
| 669,909 | 3/1901 | Young ................................ 54/80 |
| 2,407,029 | 9/1946 | Miller ................................ 54/80 |

FOREIGN PATENTS OR APPLICATIONS
1,278,860  11/1961  France .............................. 119/143

Primary Examiner—Louis G. Mancene
Assistant Examiner—James H. Czerwonky
Attorney—Robert C. Hauke, Claude A. Patalidis et al.

[57] ABSTRACT

A protective bonnet for an animal's head, having a pair of adjustable, preferably elastic, straps formed to encircle the animal's head respectively forward and behind its eyes and connected by a pair of side bands, one on each side of the animal's face. A sheet of foraminous screen material is peripherally secured to the side bands and to the portions of the straps extending over the top of the animal's nose and brow, with the sheet of screen material being relatively large to bulge outwardly of the animal's face. A modification includes a third strap attached at side portions of the rearward strap and encircling the top of the animal's head behind its ears to prevent the bonnet from slipping forwardly on the animal's face. The strap over the animal's brow may optionally be pulled around to extend behind its ears so that the screen material will also cover the ears if desired, and in another modification additional screen-mesh pockets are optionally removably attached to the straps to cover and enclose the animal's head.

18 Claims, 5 Drawing Figures 3,753,334

PROTECTIVE BONNET FOR ANIMALS

BACKGROUND OF THE INVENTION

1. Field of the Invention

My invention relates to protective devices for animals, and more particularly to devices adapted to an animal's head for protecting its eyes and optionally its ears from the intrusion of insects, dirt and other foreign objects, and from sun glare.

2. Description of the Prior Art

Various devices have been used to protect the eyes of animals from insects, dust, dirt and other foreign objects, for example as shown in U.S. Pat. Nos. 287,885; 481,152; 888,687; and 3,104,508. Generally, these devices are rather complex, are uncomfortable for the animals, overly restrict the animal's vision, are difficult to fit to different sized animals, and in some cases are ineffective for the purposes designed as well as being rather expensive.

SUMMARY OF THE INVENTION

The present invention solves the aforesaid problems by the use of an inexpensive protective bonnet which is made with a pair of preferably elastic closed loop straps sized and formed to encircle the animal's head respectively forward and behind its eyes, the straps being connected by a pair of side bands, one on each side of the animal's face. A sheet of screen material is peripherally secured, by sewing or otherwise, to the side bands and the upper portions of the straps which extend over the muzzle and brow, and is large enough to bulge outwardly to cover but be spaced a considerable distance from the animal's eyes.

A modification of the invention includes the concept of the upper portion of the rearmost strap being adapted optionally to be pulled around to extend behind the animal's ears, with the screen material being sufficiently voluminous to cover the ears. Another modification includes a third strap connected to the rearmost of the first two straps adjacent their connection to the rearmost ends of the side bands and adapted to extend behind the animal's ears to prevent the bonnet from sliding forwardly on the animal's face. Another modification includes screen-mesh pockets attached by snap fasteners or otherwise to the brow strap and to the strap behind the ears to cover and enclose the ears to protect them from gnats, flies and other insects. Although the straps are preferably elastic so that they can be stretched to fit different sized animal heads, they may be provided with buckles for size adjustment. The strap portions and the side bands to which the screen material is secured are located so that they fit closely to the animal's face to prevent the intrusion of insects.

The screen material is preferably relatively flexible but sufficiently stiff to retain a manually formed shape, and is preferably made of a small-mesh plastic net or screen material which has relatively small pores but is sufficiently transparent not to overly obstruct the animal's vision. This screen material will also be effective in preventing dust, dirt and other foreign materials from falling or being blown into the animal's eyes and ears, and acts as an effective shield from sun glare and bright lights.

Overall, the bonnet is constructed so that it in no way interferes with the animal's eating, seeing or hearing, but effectively keeps insects out of the animal's eyes and optionally its ears, this being a very severe problem, particularly with horses. It may be worn conveniently by the animal when at liberty in pasture or in the paddock without becoming dislodged while grazing or from rubbing against fence posts or the like. Furthermore, the bonnet may be worn with or without a bridle or halter, and may, if desired, be secured thereto by any desired means.

BRIEF DESCRIPTION OF THE DRAWINGS

For a more complete understanding of the invention, reference may be had to the accompanying drawings illustrating preferred embodiments of the invention in which like reference characters refer to like parts throughout the several views, and in which.

DESCRIPTION OF THE PREFERRED EMBODIMENTS

Figure 1:
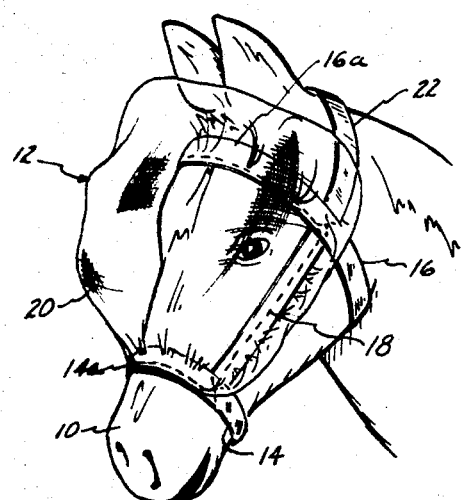
FIG. 1 is a perspective view of a horse's head illustrating the device of the present invention as worn.

FIG. 1 illustrates the head 10 of an animal, preferably but not necessarily a horse, with a preferred protective bonnet 12 in place. Basically, the bonnet comprises first and second face straps 14 and 16 respectively encircling the animal's head forwardly and rearwardly of its eyes. As shown, these straps 14 and 16 are connected by a pair of side bands 18, one on each side of the animal's face (one only seen).

A sheet of screen material 20, preferably of an original planar area considerably larger than the planar area encompassed by the side bands 18 and upper portions 14a and 16a of the straps 14 and 16 extending over the top of the animal's face, is secured to the side bands 18 and portions 14a and 16a. The peripheral edges of the screen material 20 are gathered and preferably sewn as indicated along the dash lines to the side bands 18 and the upper portions 14a and 16a of the straps 14 and 16, so that when the device is fitted over the animal's face the screen material will bulge outwardly so that it does not contact the face or eyes. The side bands 18 and the portions 14a and 16a of the straps 14 and 16 to which the screen material is attached are, as seen, positioned to lie closely against the face of the animal to prevent intrusion of insects beneath the bonnet.

The screen 20 is preferably made of nylon or other like synthetic material, which is flexible yet sufficiently stiff to retain the outwardly bulging shape as shown, which is readily manually formed. This material has quite a small mesh so that it will also serve as an effective barrier to much of the dust, dirt, falling leaves, twigs, branches and other foreign matter which might otherwise strike or be blown into the animal's eyes.

Although a bonnet consisting of the straps 14 and 16, side bands 18 and screen material 20 may be sufficient, an additional strap 22, having its ends secured to the rear strap 16 adjacent the attachment points for the side bands 18, is adapted to encircle the animal's head behind its ears to thereby effectively counteract any tendency of the bonnet structure to slide forward on the animal's face.

Figure 2:
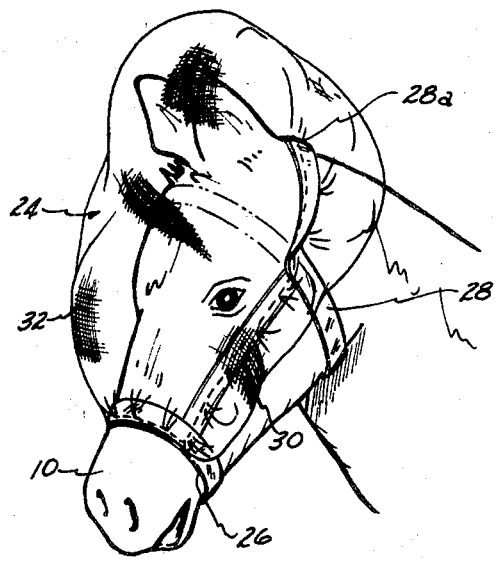
FIG. 2 is a perspective view similar to that of FIG. 1 but illustrating a modification of the invention.
Figure 3:
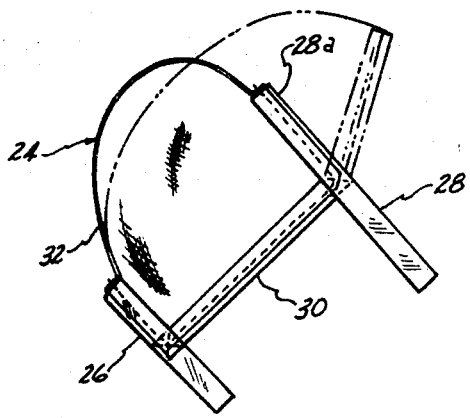
FIG. 3 is a side elevational view of the protective bonnet of FIG. 2 illustrating its optional configurations.

FIGS. 2 and 3 illustrate a similar construction of protective bonnet 24 comprising forward and rear straps 26 and 28 connected by side bands 30, but in which the sheet of screen material 32 is larger than in the embodiment of FIG. 1, so that the upper portion 28a of the rear strap 28 may be optionally pulled backwardly behind the animal's ears to the position indicated in FIG. 2, in which case the screen material 32 will additionally cover and protect the ears.

In the embodiments of FIGS. 1 and 2, the straps and side bands are preferably made of a broad elastic fabric material and are sized smaller than a desired minimum size head, so that the bonnet is substantially self-retained, and so that they can yet stretch to accommodate animal heads of various larger sizes. The strap 22 may, if desired, be open-ended and provided with any suitable buckle arrangement.

Figure 4:
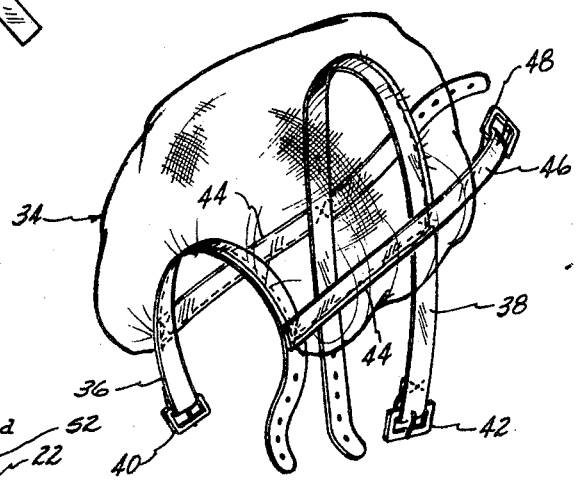
FIG. 4 is another preferred modification of the invention.

FIG. 4 illustrates another embodiment of a bonnet 34 having straps 36 and 38 which are open-ended and provided with buckles 40 and 42 as shown. The side bands 44 in this embodiment may be elastic or not as desired. A third strap 46 to extend behind the animal's ears is also preferably open-ended and provided with a buckle 48. All of the straps and side bands may be either elastic or nonelastic as desired.

Figure 5:
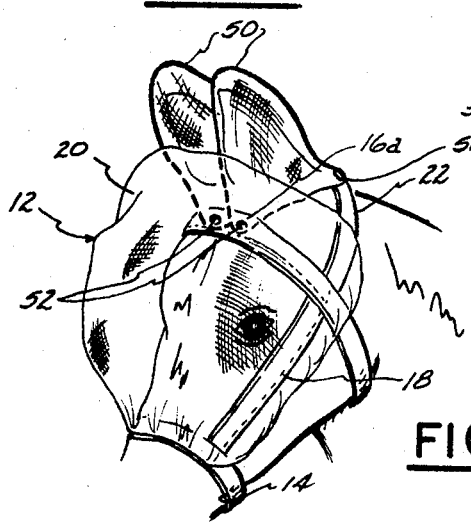
FIG. 5 is a further modification of the invention illustrating optionally attached ear pockets.

In FIG. 5, a modification of the invention includes screen-mesh pockets 50 attached by any preferred means such as snap fasteners 52 to the brow strap portion 16a and to the strap 22 behind the animal's ears (as used in FIG. 1) to enclose and protect it from gnats, flies, dirt or other foreign matter. This modification may be preferred over the modification shown in FIGS. 2 and 3 which require a rather voluminous sheet of screen material to optionally extend over the ears. If desired, a single pocket enclosing both ears may be used.

It will be noted that although the present invention is illustrated as adapted for horses and animals with like head configurations, it may be readily sized and formed to fit other animals having differently shaped heads.

Although I have shown only a few embodiments of my invention, it will be apparent to one skilled in the art to which the invention pertains that various changes and modifications may be made therein without departing from the spirit of the invention or the scope of the appended claims.

I claim:

1. A protective bonnet for an animal's head comprising:
   a. spaced first and second straps formed to encircle the animal's head respectively forward and behind the animal's eyes;
   b. a pair of spaced side bands connecting said straps, one of said straps being positioned on each side of the animal's face; and
   c. a sheet of relatively close-mesh, substantially transparent, foraminous netting, said netting having its peripheral edges secured to said bands and to portions of said straps extending between the ends of said bands and over the top of the animal's face, to thereby shield the animal's eyes, and wherein said netting is of much greater area than the planar area encompassed by the bands and strap portions to which the netting is secured, to thereby bulge outwardly of the animal's eyes.

2. The protective bonnet as in claim 1 wherein said netting is relatively flexible but sufficiently stiff to retain a shape to which it may be manually formed.

3. The protective bonnet as in claim 1 wherein said netting is of synthetic material.

4. The protective bonnet as in claim 1 wherein said straps are length adjustable to adapt to differently sized heads.

5. The protective bonnet as in claim 1 wherein said straps are elastic.

6. The protective bonnet as in claim 1 wherein said side bands are length adjustable.

7. The protective bonnet as in claim 1 wherein said side bands are elastic.

8. The protective bonnet as in claim 1 wherein said straps and side bands lay close to the animal's face to restrict entry of insects beneath said netting.

9. The protective bonnet as in claim 1 wherein the strap behind the animal's eyes extends behind the ears of the animal so that said netting covers said ears.

10. The protective bonnet as in claim 1 wherein the strap behind the animal's eyes is disposed forwardly of the ears of the animal and across the animal's brow.

11. The protective bonnet as in claim 1 including a third strap connecting side portions of said second strap and extending behind the ears of said animal.

12. The protective bonnet as in claim 11 wherein said third strap is length adjustable.

13. The protective bonnet as in claim 11 wherein said third strap is elastic.

14. The protective bonnet as in claim 11 wherein the ends of said third strap connect to said second strap adjacent the ends of said side bands connected thereto.

15. The protective bonnet as in claim 11 and including at least one pocket member attached to the second and third strap and enclosing the ears of said animal.

16. The protective bonnet as in claim 15 including a separate pocket enclosing each ear of said animal.

17. The protective bonnet as in claim 15 and including snap fastener means attaching said pocket to said second and third straps.

18. A protective bonnet for an animal's head comprising:
   a. spaced first and second straps formed to encircle the animal's head respectively forward and behind the animal's eyes;
   b. a pair of spaced side bands connecting said straps, one of said bands being positioned on each side of the animal's face; and
   c. a sheet of foraminous screen material having its peripheral edges secured to said bands and to portions of said straps extending between the ends of said bands and over the top of the animal's face, to thereby shield the animal's eyes, and wherein the strap behind the animal's eyes is arranged to be positioned optionally across the animal's brow or behind the ears of the animal so that the screen material covers said ears.

* * * * *

UNITED STATES PATENT AND TRADEMARK OFFICE
CERTIFICATE OF CORRECTION

PATENT NO. : 3,753,334
DATED : August 21, 1973
INVENTOR(S) : Jacqueline M. Blessing It is certified that error appears in the above-identified patent and that said Letters Patent are hereby corrected as shown below:

Column 3, line 56, change "straps" to --side bands--.

Signed and Sealed this

Twenty-fourth Day of March 1981

[SEAL]

Attest:

RENE D. TEGTMEYER

Attesting Officer    Acting Commissioner of Patents and Trademarks